(12) United States Patent
Chapman et al.

(10) Patent No.: US 6,733,267 B2
(45) Date of Patent: *May 11, 2004

(54) SOLID IMAGING APPARATUS AND METHOD WITH COATING STATION

(75) Inventors: Brian Gregory Chapman, Elkton, MD (US); Christian Henning Clausen, Woodbury, NJ (US); Daniel James Mickish, Wilmington, DE (US); Eustathios Vassiliou, Newark, DE (US)

(73) Assignee: DSM Desotech, Inc., Elgin, IL (US)

( * ) Notice: Subject to any disclaimer, the term of this patent is extended or adjusted under 35 U.S.C. 154(b) by 148 days.

This patent is subject to a terminal disclaimer.

(21) Appl. No.: 10/006,369

(22) Filed: Dec. 10, 2001

(65) Prior Publication Data

US 2002/0122839 A1 Sep. 5, 2002

Related U.S. Application Data

(63) Continuation of application No. 09/541,025, filed on Mar. 31, 2000, now Pat. No. 6,340,297, which is a continuation of application No. 08/804,449, filed on Feb. 21, 1997, now Pat. No. 6,174,156, which is a continuation of application No. 07/884,030, filed on May 18, 1992, now Pat. No. 5,626,919, which is a continuation-in-part of application No. 07/804,269, filed on Dec. 5, 1991, now abandoned, which is a continuation of application No. 07/488,095, filed on Mar. 1, 1990, now abandoned.

(51) Int. Cl.[7] .............................................. B29C 35/08
(52) U.S. Cl. ..................... 425/174.4; 264/401; 264/492
(58) Field of Search ....................... 425/174.4; 264/482, 264/493, 401

(56) References Cited

U.S. PATENT DOCUMENTS 2,069,322 A   2/1937  Mellor et al.
2,295,280 A   9/1942  Fordyce
2,322,827 A   6/1943  Carver (List continued on next page.)

FOREIGN PATENT DOCUMENTS

| EP | 0250121   | 12/1987 |
| EP | 0450762   | 10/1991 |
| JP | 61-114817 | 6/1986  |
| JP | 61-114818 | 6/1986  |
| JP | 61-116322 | 6/1986  |

OTHER PUBLICATIONS

Automatic Method for Fabricating a Three–Dimensional Plastic Model with Photo–Hardening Polymer, Hideo Kodama, Rev. Sci. Instrum. 52(11), Nov. 1981, pp. 1770–1773.

A Review of 3D Solid Object Generation, A.J. Herbert, 1989, SPSE–The Society for Imaging Science and Technology, pp. 186–190.

Solid Object Generation, Alan J. Hebet, 1982, Society of Photographic Scientists and Engineers, pp. 185–188.

Primary Examiner—W. L. Walker
Assistant Examiner—Emmanuel Luk
(74) Attorney, Agent, or Firm—Pillsbury Winthrop LLP

(57) ABSTRACT

A solid imaging apparatus and method produces an integral three-dimensional object from a multiplicity of cross sectional portions of the object by selectively exposing successive layers of a liquid photoformable composition to actinic radiation. The apparatus includes a vessel for containing the composition so as to present a free surface, and a movable platform disposed within the vessel below the free surface. Part of the composition is transferred above the free surface by lowering and raising a dispenser at predetermined positions located away from the platform. A doctor blade contacts the composition transferred above the free surface, and then moves over the platform to form a substantially uniform layer of the composition.

29 Claims, 7 Drawing Sheets

U.S. PATENT DOCUMENTS

| | | |
|---|---|---|
| 2,369,484 A | 2/1945 | Nadeau |
| 2,775,758 A | 12/1956 | Munz .......................... 343/17 |
| 4,575,330 A * | 3/1986 | Hull .......................... 425/174.4 |
| 4,752,498 A | 6/1988 | Fudim ........................ 427/54.1 |
| 4,801,477 A | 1/1989 | Fudim ........................ 427/54.1 |
| 4,929,402 A | 5/1990 | Hull ........................... 427/54.1 |
| 4,942,060 A | 7/1990 | Grossa ....................... 427/54.1 |
| 4,942,066 A | 7/1990 | Fan et al. ................... 427/54.1 |
| 4,987,044 A * | 1/1991 | Vassiliou ..................... 430/20 |
| 5,011,635 A | 4/1991 | Murphy et al. |
| 5,014,207 A * | 5/1991 | Lawton ....................... 364/468 |
| 5,026,146 A * | 6/1991 | Hug et al. ................... 350/356 |
| 5,071,337 A | 12/1991 | Heller et al. ................ 118/620 |
| 5,076,974 A | 12/1991 | Modrek et al. .............. 264/22 |
| 5,089,185 A | 2/1992 | Hirano et al. .............. 427/53.1 |
| 5,120,476 A | 6/1992 | Scholz ........................ 427/53.1 |
| 5,139,711 A | 8/1992 | Nakamura et al. ......... 427/53.1 |
| 5,143,817 A | 9/1992 | Lawton et al. ............. 427/53.1 |
| 5,171,490 A | 12/1992 | Fudim ........................ 264/401 |
| 5,174,931 A | 12/1992 | Almquist et al. ........... 264/401 |
| 5,182,715 A | 1/1993 | Vorgitch et al. ............. 264/401 |
| 5,204,823 A | 4/1993 | Schlotterbeck .............. 264/401 |
| 5,216,616 A | 6/1993 | Masters ...................... 264/401 |
| 5,238,614 A | 8/1993 | Uchinono et al. ........... 264/401 |
| 5,263,130 A | 11/1993 | Pomerantz et al. ......... 264/401 |
| 5,330,574 A | 7/1994 | Nakagawa et al. ......... 118/120 |
| 5,358,673 A | 10/1994 | Heller et al. ................ 427/510 |
| 5,447,822 A | 9/1995 | Hull et al. ................... 264/401 |
| 5,474,719 A | 12/1995 | Fan et al. .................... 427/510 |
| 5,573,721 A | 11/1996 | Gillette ....................... 427/510 |
| 5,609,814 A | 3/1997 | Takano ....................... 427/510 |
| 5,626,919 A | 5/1997 | Chapman et al. ........... 427/510 |
| 5,718,951 A | 2/1998 | Sterett et al. ................ 427/466 |
| 5,780,070 A | 7/1998 | Yamazawa et al. ....... 425/174.4 |
| 5,833,914 A | 11/1998 | Kawaguchi ................. 264/401 |
| 5,902,537 A | 5/1999 | Almquist et al. |
| 5,922,364 A | 7/1999 | Young, Jr. ............... 425/174.4 |
| 5,945,058 A | 8/1999 | Manners et al. ............. 264/401 |
| 6,159,411 A | 12/2000 | Kulkarni et al. ............ 264/401 |
| 6,174,156 B1 | 1/2001 | Chapman et al. ........ 425/174.4 |

* cited by examiner

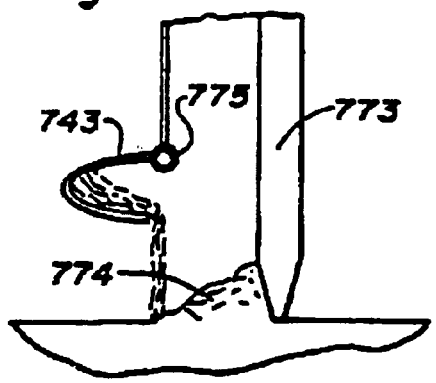
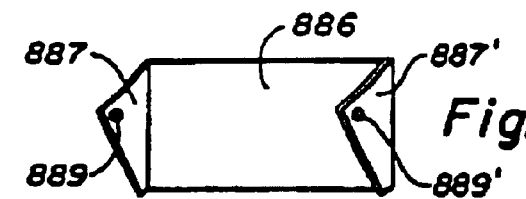
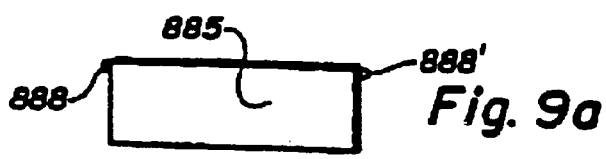
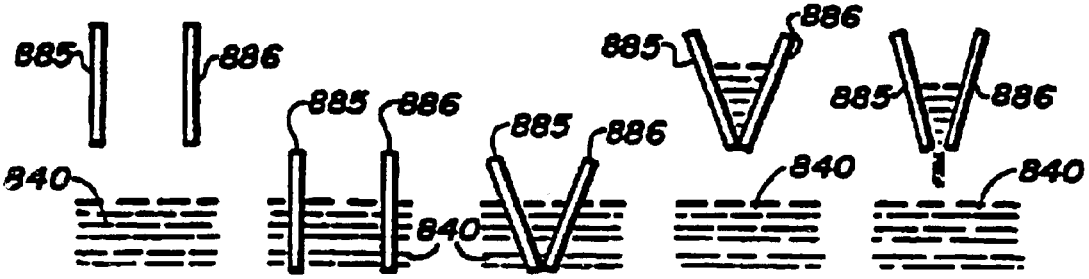
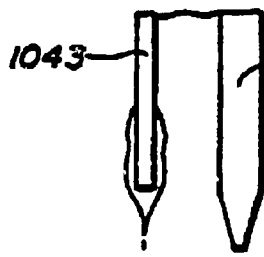
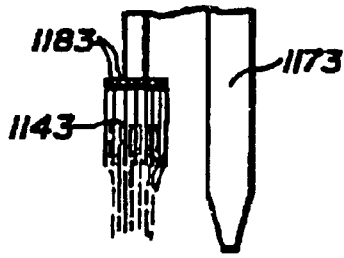
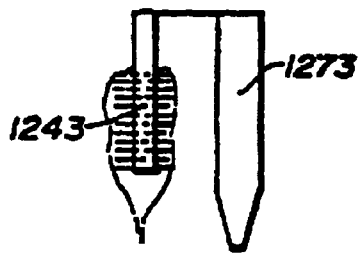
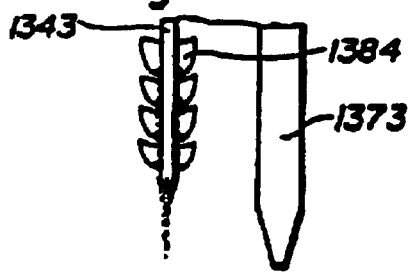
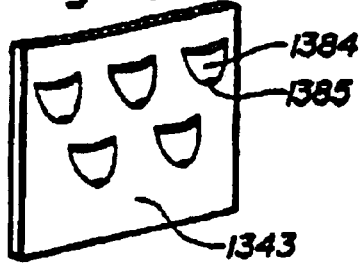

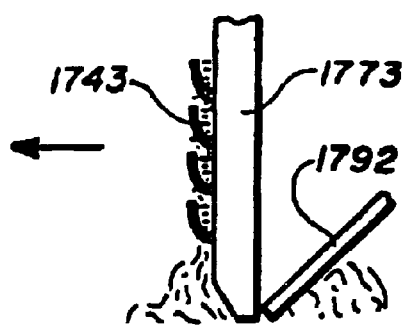 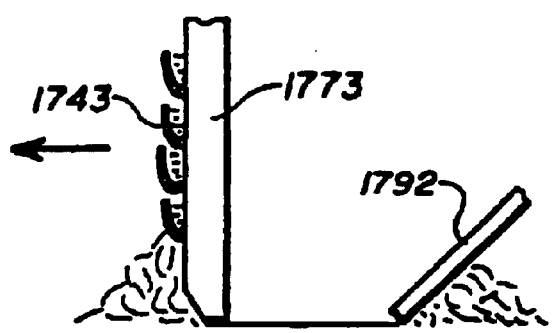
Fig. 17a  Fig. 17b
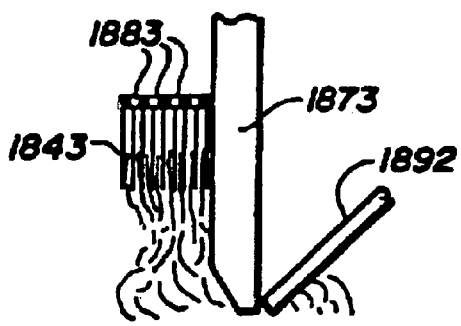 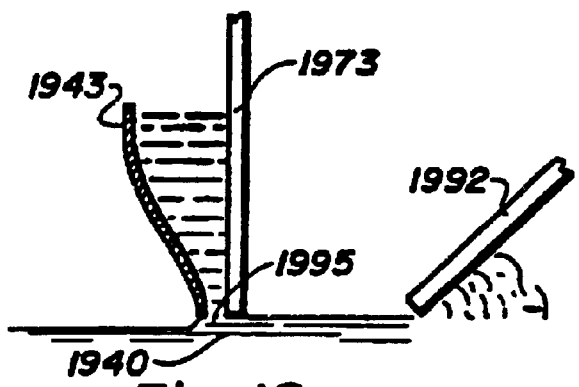
Fig. 18  Fig. 19
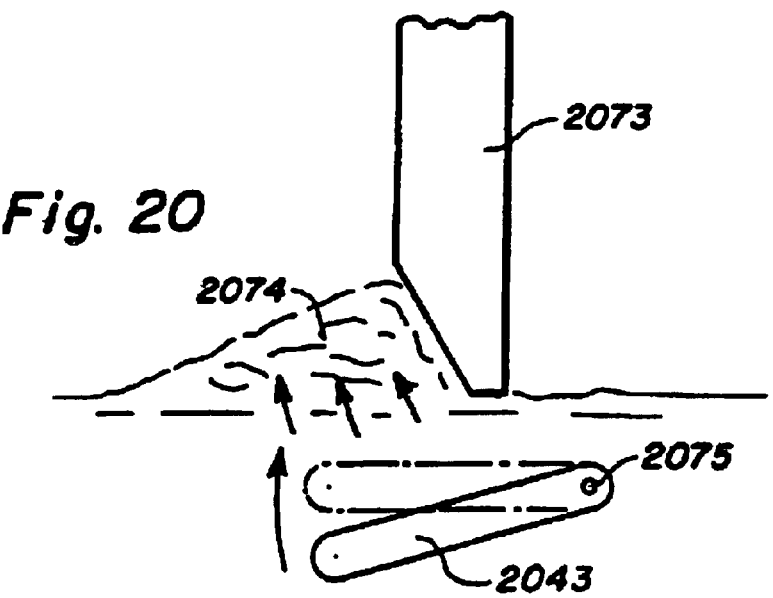
Fig. 20

SOLID IMAGING APPARATUS AND METHOD WITH COATING STATION

CROSS REFERENCE TO RELATED APPLICATIONS

The present application is a continuation of application Ser. No. 09/541,025, filed Mar. 31, 2000, now U.S. Pat. No. 6,340,297, which is a continuation of application Ser. No. 08/804,449, filed Feb. 21, 1997 (now U.S. Pat. No. 6,174,156 B1), which is a continuation application Ser. No. 07/884,030, filed May 18, 1992 (now U.S. Pat. No. 5,626,919), which is a continuation-in-part of application Ser. No. 07/804,269, filed Dec. 5, 1991, now abandoned, which is a continuation of application Ser. No. 07/488,095, filed Mar. 1, 1990, now abandoned.

BACKGROUND OF THE INVENTION

1. Field of the Invention

This invention pertains to a solid imaging method and apparatus for fabricating an integral three-dimensional object from a multiplicity of cross sectional portions of the object. More particularly, the cross sectional portions correspond to solidified portions of contiguous layers of a photoformable composition. The method and apparatus use a dispenser in a coating station, which transfers part of the all photoformable composition over the free surface of the composition so that a doctor blade may produce a uniform liquid layer.

2. Description of Related Art

Many systems for production of three-dimensional modeling by photoforming have been proposed. European Patent Application No. 250,121 filed by Scitex Corporation Ltd., on Jun. 6, 1987, discloses a three-dimensional modeling apparatus using a solidifiable liquid, and provide a good summary of documents pertinent to this art. U.S. Pat. No. 4,575,330, issued to C. W. Hull on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction. Successive adjacent laminae, representing corresponding successive adjacent cross-sections of the object, are automatically formed and integrated together to provide a step-wise laminar buildup of the desired object, whereby a three-dimensional object is formed and drawn from a substantially planar surface of the fluid medium during the forming process. U.S. Pat. No. 4,752,498, issued to E. V. Fudim on Jun. 21, 1988, describes an improved method of forming three-dimensional objects, which comprises irradiating an uncured photopolymer by transmitting an effective amount of photopolymer solidifying radiation through a radiation transmitting material which is in contact with the uncured liquid photopolymer. The transmitting material is a material which leaves the irradiated surface capable of further crosslinking, so that when a subsequent layer is formed it will adhere thereto. Using this method, multilayer objects can be made.

A publication entitled "Automatic Method for fabricating a three-dimensional plastic model with photohardening polymer" by Hideo Kodama, Rev. Sci. Instrum. 52(11), 1770–1773. November 1981, describes a method for automatic fabrication of a three-dimensional plastic model. The solid model is fabricated by exposing liquid photo-forming polymer to ultraviolet rays, and stacking the cross-sectional solidified layers. A publication entitled "Solid Object Generation" by Alan J. Herbert, Journal of Applied Photographic Engineering, 8(4), 185–188, August 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory. A good review of the different methods is also given by a more recent publication entitled "A Review of 3D Solid Object Generation" by A. J. Herbert, Journal of Imaging Technology 15: 186–190 (1989).

Most of these approaches relate to the formation of solid sectors of three-dimensional objects in steps by sequential irradiation of areas or volumes sought to be solidified. Various masking techniques are described as well as the use of direct laser writing, i.e., exposing a photoformable composition with a laser beam according to a desired pattern and building a three-dimensional model, layer by layer. In addition to various exposure techniques, several methods of creating thin liquid layers are described which allow both coating a platform initially and coating successive layers previously exposed and solidified.

The aforementioned methods of coating, however, are not capable of ensuring flat uniform layer thickness or of producing such layers quickly, or they do not effectively prevent damage or distortion to previously formed layers during the successive coating process and they involve coating only liquid formulations of preferably low viscosity. Furthermore, they omit to recognize very important parameters involved in the coating process such as the effects of having both solid and liquid regions present during the formation of the thin liquid layers, the effects of fluid flow and Theological characteristics of the liquid, the tendency for thin photoformed layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example, describes a dipping process where a platform is dipped below the distance of one layer in a vat, then brought up to within one layer thickness of the surface of the photoformable liquid. Hull further suggests that low viscosity liquids are preferable but, for other practical reasons, the photoformable liquids are generally high viscosity liquids. Motion of the platform and parts, which have cantilevered or beam regions (unsupported in the Z direction by previous layer sections) within the liquid, creates deflections in the layers, contributing to a lack of tolerance in the finished part. In addition, this method is rather slow.

U.S. Pat. No. 2,775,758, issued to O. J. Munz on Dec. 25, 1956, and the Scitex application describe methods by which the photoformable liquid is introduced into a vat by means of a pump or similar apparatus such that the new liquid level surface forms in one layer thickness over the previously exposed layers. Such methods have the aforementioned disadvantages of the Hull method except that the deflection of the layers during coating is reduced.

The patent issued to Fudim describes the use of a transmitting material to fix its the surface of a photopolymner liquid to a desired shape, assumably flat, through which photopolymers of desired thickness are solidified. The transmitting material is usually rigid and either coated or inherently nonadherent to the solidified photopolymer The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds, vacuum forces, and the like are still present and in some cases substantial enough to cause damage or distortion to the photopolymer during removal from the transmitting material surface.

Methods utilizing doctor blades and/or material supply mechanisms have been proposed in such publications as Japanese Patent Application Publication numbers 61-114817, 61-114818, and 61-116322. However, these methods require an exact amount of material or photoformable composition to be added in the vessel every time a layer has to be formed. Also, they require the doctor blade or smoothening blade to have a length equal to the width of the vessel in order to properly operate. Because of this, the systems described in these patents have restrictions necessarily confining the photosensitive material between the doctor blade and part of the vessel at all times. Thus, it becomes very difficult to form a uniform layer in one continuous pass of the doctor blade without ending up with an excess or shortage of material at the end of the pass. In other words, the doctored layer may be either lacking a part of it at the end of one doctoring operation or it may have an excess of material, which will be very difficult to redistribute in order to achieve the proper thickness and uniformity, due to the confined nature of the arrangement. Also, the doctor blade has a tendency to create wave motion in the material surrounding the previously exposed layer causing a disturbing effect, particularly on parts of the previously exposed layer which are partially unsupported.

Thus, it is one of the objects of the present invention to provide an apparatus and a method for fabricating an integral three-dimensional object from a multiplicity of cross sectional portions of the object, the cross sectional portions corresponding to solidified portions of contiguous layers of a photoformable liquid composition, in a fast and uniform manner. Another object of the present invention is to provide a gentle way of raising part of the photoformable composition above the surface of said composition and in front of the doctor blade. Use of a pump to recirculate a liquid of the nature used in solid imaging or stereolithography does not present a viable solution because the viscosity and mainly sensitivity of such compositions cause blockage of the paths and seizure of the pumping operation at an unacceptably high rate. Premature polymerization within the higher-shear components of the pump seem to be the most probable cause of this problem.

SUMMARY OF THE INVENTION

The present invention comprises a solid imaging apparatus and method for fabricating an integral three-dimensional object by selectively exposing successive layers of a liquid photoformable composition to actinic radiation. The apparatus includes a vessel for containing the composition so as to present a free surface, and a movable platform disposed within the vessel below the free surface. Part of the composition is transferred above the free surface by lowering and raising a dispensers at predetermined positions located away from the platform. A doctor blade contacts the composition transferred above the free surface, and then moves over the platform to form a substantially uniform layer of the composition.

BRIEF DESCRIPTION OF THE DRAWINGS

FIG. 7 is an elevation view showing another dispenser where a pivoting mechanism is utilized for dispensing the liquid.

FIGS. 8a through 8e are elevation views showing another embodiment of this invention.

FIGS. 9a and 9b are perspective views showing another embodiment of the invention.

FIG. 10 is an elevation view showing a different embodiment of the present invention where the dispenser is in the form of a single plate.

FIG. 11 is an elevation view of another embodiment wherein the dispenser is in the form of parallel blades.

FIG. 12 is an elevation view showing the dispenser as a plate having a plurality of bristles attached to its sides so as to have a brush-like configuration.

FIG. 13a is an elevation view showing still another embodiment of the present invention where the dispenser is in the form of a plate having a plurality of pockets on either side.

FIG. 13b is a perspective view illustrating the embodiment of FIG. 13a.

FIG. 14b is a perspective view illustrating the embodiment of FIG. 14a.

FIGS. 16a, 16b, 17a, 17b and 18 are elevation views illustrating other embodiments of this invention where the dispenser has been incorporated onto the, front part of the doctor blade.

FIG. 19 is an elevation view illustrating yet a different embodiment of the present invention where the dispenser and the doctor blade have been combined into a single unit.

FIG. 20 is an elevation view showing another embodiment where the dispenser is always disposed in the liquid and pulsates to form a wave in front of the doctor blade.

DETAILED DESCRIPTION OF THE PREFERRED EMBODIMENTS

The present invention is directed to a solid imagine method and apparatus for fabricating an integral three-dimensional object from a multiplicity of cross sectional portions of the object. More particularly, the cross sectional portions correspond to solidified portions of contiguous layers of a photoformable composition. The method and apparatus use a dispenser in a coating station, which transfers part of the photoformable composition over the free surface of the composition so that a doctor blade may produce a uniform liquid layer.

Figure 1:
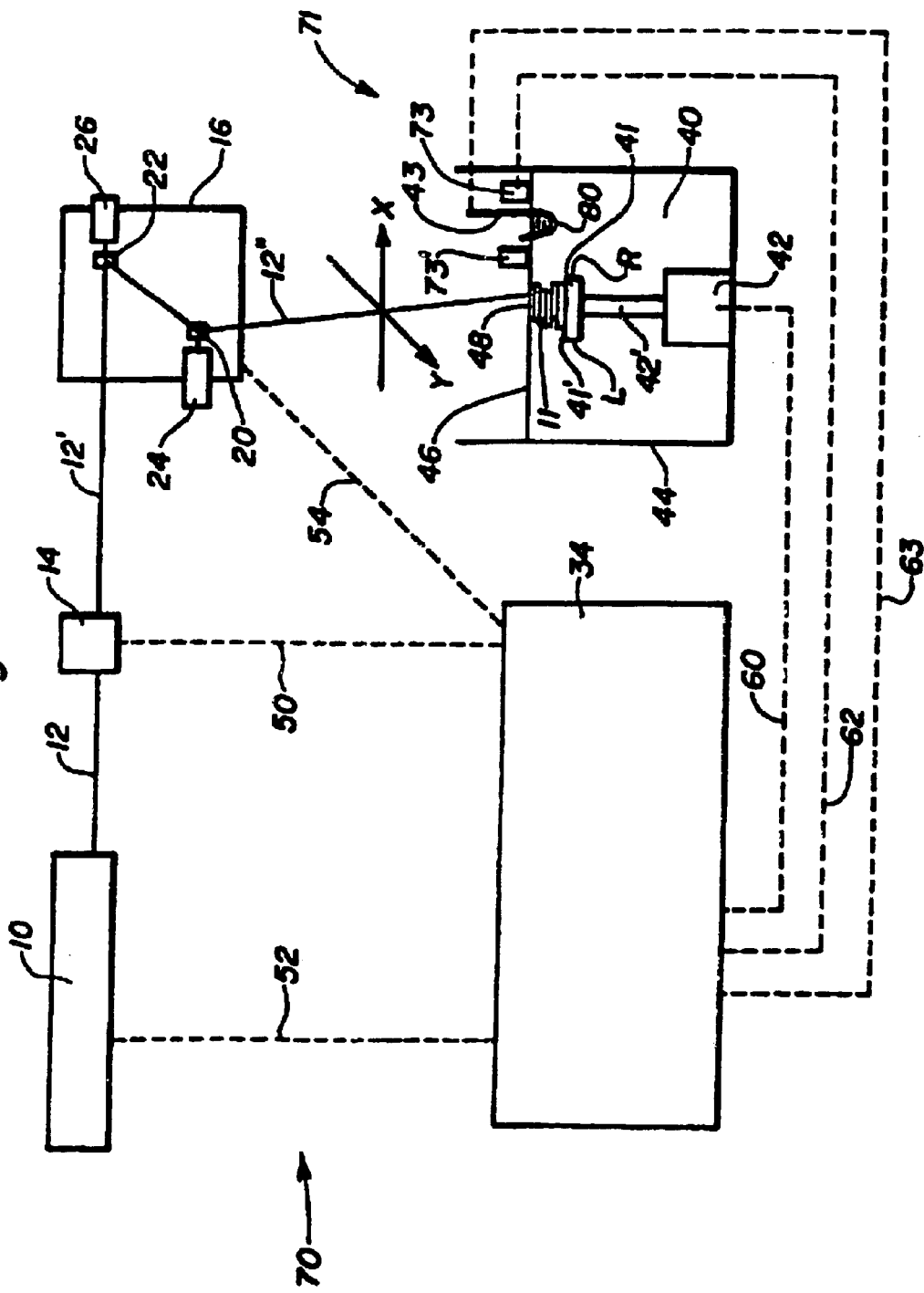
FIG. 1 is a diagrammatic view showing a preferred embodiment of this invention.

FIG. 1 shows an imaging station or means 70 including a radiation source 10, a modulator 14, a computer 34 and a deflection means 16, preferably in the form of a scanner. There is also provided a coating station 71. Radiation source 10 is preferably a laser, producing a radiation beam 12. In order to produce solid objects at high speed, the imaging station 70 preferably utilizes relatively high power radiation sources 10, such as high power lasers, which may have major bands in the visible, infrared, or ultraviolet regions. For present photospeeds of photoformable compositions, high power is considered to be a power greater than 20 mW, and preferably over 100 mW as measured from the intensity of the radiation beam 12. However, as faster compositions become available, the values of 20 mW and 100 mW for the beam intensity will become lower accordingly, since photospeed of the composition and intensity of the radiation beam have an inverse relation to each other in order to achieve the same results. The selection of a certain type of laser should be coordinated with the selection of the photoformable composition in a way that the sensitivity of the photoformable composition agrees reasonably well with the wavelength of the laser's emission. Other types of radiation means may also be utilized such as electron beams, x-rays, and the like, as long as their energy type is matched with the sensitivity of the photoformable composition, a beam is provided, and the appropriate conditions for their handling are observed according to established ways, well known in the art Although means may be provided to modify the shape of the beam cross-section to any desirable shape, the ordinary shape is circular, and the profile of the intensity of the beam is gaussian with a maximum at the center of the circular shape.

The radiation beam 12 passes through the modulator 14, preferably an acousto-optical modulator. The modulated radiation beam 12' passes in turn through the deflection means 16 or scanner, which comprises two mirrors 20 and 22, each mirror having an axis (not shown) allowing reflection of the beam to a free surface 46 in X and Y directions, the X and Y directions being perpendicular to each other and parallel to the free surface 46. The mirrors 20 and 22 may rotatably move around their corresponding axes by means of motors 24 and 26, respectively, for controllably deflecting the beam in a vector scanning mode, in the X and Y directions, towards predetermined positions of a photoformable composition 40 contained in a vessel 44 of the coating station 71. As the beam is deflected by the deflection means 16, it assumes an acceleration from zero level to a maximum acceleration, and a velocity from zero level to a maximum constant velocity. The velocity and intensity of the beam remain proportional to each other, so that the exposure remains substantially constant. The beam 12" exposes preselected portions of the composition to a substantially constant depth as described below.

For the purpose of this invention, the radiation beam 12" may be not only a focused beam from a laser, but also light from any other light source, modified in a number of different ways. For example, it may be transmitted through any type of variable optical density photomask such as a liquid crystal display, silver halide film, electro-deposited mask etc., or reflected off of any variable optical density device, such as a reflective liquid crystal cell. Also, the deflection means may be any other type of scanner, such as a raster scanner, for example.

The coating station 71 comprises a vessel 44 for containing the liquid photoformable composition 40. A substantially flat platform 41 is disposed within the vessel 44 and adapted to be positioned under the free surface 46 of the composition 40. The platform 44 has sides, such as a left L and a right R side. A placement means 42 is provided for controllably varying the distance between the free surface 46 of the composition 40 and the platform 41 through a supporting arm 42'. Although the placement means 42 is shown in FIG. 1 as being fully immersed in the composition 40, it should be understood that it may be preferably positioned outside the vessel, and connected to the platform 41 either by passing the supporting arm 42' through a seal at the bottom of vessel 44, or more preferably by using a bent supporting arm passing around the vessel and through free surface 46 in order to be connected to and support the platform 41. An important part of the invention is a special dispenser 43 located at one side of the platform 41, in front of any type of layering means, and preferably between two doctor blades 73 and 73'. The dispenser 43 is adaptable to be dipped under the tree surface 46 of the composition 40 and directly transfer part of the composition 40 above the free surface 46. The transferred part of the composition is used by the doctor blades 73 and 73' to produce a liquid layer 48 on top of the platform 41 or on top of previously photoformed layers. As shown in FIG. 1, communication lines 52, 50, 54, 60, 62, and 63 are also provided for the computer' 34 to control the radiation source 10, the modulator 14, the deflection means 16, the placement means 42, the doctor blades 73 and 73', and the dispenser 43, respectively.

In operation of the preferred embodiment of this invention, the radiation means 10 provides a radiation beam 12 having an intensity as aforementioned. The radiation beam 12 passes through a modulator 14, where its intensity may be modulated from a zero intensity level to a maximum intensity level having a value less than that of the unmodulated beam intensity, due to energy losses. The modulated radiation beam 12', having somewhat decreased intensity due to losses, passes in turn through the deflection means 16 having a two-mirror 20 and 22 assembly, each mirror separately driven by a different motor 24 and 26, respectively. Mirror 20 deflects the beam in a X direction, while mirror 22 deflects the beam in a Y direction, the X direction being perpendicular to the Y direction. Electrical feedback regarding the relative movements of the mirrors 20 and 22 is provided by the deflection means 16 to the computer 34 through line 54. This feedback, being correlatable to the velocity and average residence time of the beam 12" on the predetermined portions of the thin layer 48, is processed by the computer 34, and it is fed to the modulation means 14 as a control command through line 50 in order to modulate the intensity of the radiation beam 12, so that the product of the intensity of the beam 12" and the average residence time at each position of the predetermined portions of layer 48 remains substantially constant. Thus, the exposure level, being by definition the product of these two parameters, remains substantially constant. By maintaining the exposure level constant over the predetermined portions of each contiguous thin layer, the thickness of the layers is also kept substantially constant This correction or compensation is very important, especially at unsupported portions of the thin layers, where swollen edges will appear as a result of overexposure due to the low initial velocity at the edges in vector scanning. The higher the intensity of the beam 12", or the higher the photosensitivity of the photoformable composition, the more severe this problem becomes in the absence of means to maintain the exposure level constant. Such exposure control is also necessary in raster scanning or in systems incorporating overscanned vector schemes, the difference being that the edges of the image may be underexposed due to lack of exposure contribution from adjacent non-exposed regions. In these cases, modulation means are utilized to ensure that edge regions of the image receive substantially the same exposure as non-edge regions. In any event, the radiation beam 12" is controllably directed towards the photoformable composition 40.

The platform 41, which has a substantially flat upper surface 41', is initially placed within the vessel 44 in a way that the flat upper surface 41' is contained within the free surface 46 of the composition 40. In sequence, the platform 41 is lowered in the composition 40 by the thickness of the layer 48. The dispenser 43, which is preferably kept at least partially dipped under the free surface 46 of the photoformable composition 40 when not in motion, is raised and starts dispensing liquid composition 40 between the doctor blades 73 and 73'. The doctor blade 73 then produces a uniform liquid layer 48 on top of the substantially flat surface 41' of platform 41. In FIG. 1, the dispenser 43 is shown to be partially dipped in the composition 40 adjacent the right side R of the platform 41. When the doctor blades 73 and 73' and the dispenser 43 reach the left side L of the platform 41 they stop, and the dispenser 43 is preferably at least partially dipped in composition 40 under the free surface 46 to Preferably, the dispenser 43 remains completely dipped at this stage. A short time may be allowed, if necessary, for the free surface 46 to reach equilibrium and assume the desired uniformity. At least a portion of the liquid layer 48 is then exposed imagewise by actinic radiation, which preferably is in the form of the laser beam 12".

After this fast imaging step, the platform 41 is lowered again by the thickness of the layer 48. The dispenser 43, which was now kept partially dipped under the free by surface 46 of the photoformable composition 40 at the left side L of the platform, is raised and starts dispensing liquid composition 40 between the doctor blades 73 and 73'. The doctor blade 73' then produces a uniform liquid layer 48 on top of the platform 41 and previously photoformed layer as the assembly of blades 73 and 73' and dispenser 43 now moves towards the right side R of the platform 41. When the assembly of the doctor blades 73 and 73' and the dispenser 43 reaches the right side R of the platform 41 they stop again, and the dispenser 43 is dipped in the composition 40 under the free surface 46. A short time may be allowed again, if necessary, for the free surface 46 to reach equilibrium and assume the desired uniformity. At least a portion of the liquid layer 48, now being on top of the previously imagewise exposed layer, is exposed imagewise to the laser beam 12a. The above steps are repeated until all contiguous layers have been produced and the three dimensional object has been completed. All the above steps are coordinated by the computer 34 in a conventional manner.

In the present invention, the equilibrium level of the free surface 46 always remains substantially constant, regardless of the distance moved by the platform, because the amount of photoformable composition 40 within the vessel 44 remains the same since no additional composition 40 is added. The composition needed for successive layers 48 is transferred above the free surface 46 by lowering and raising the dispenser 43 at predetermined positions alongside the platform 41. Since the dispenser 43 dips under the free surface 46 and directly transfers part of the composition above the free surface 46, the temporary level of the free surface 46 will be lowered, relative to the previous equilibrium level, due to transfer of some of the composition and the dispenser 43 above the free surface 46. However, after the dispenser 43 is again dipped into the composition 40 below this temporary free surface 46, the free surface 46 quickly returns to its equilibrium level. Consequently, the equilibrium level of the free surface 46 will always remain substantially the same, thereby ensuring that the distance between the deflection means 16 and the free surface 46 remains substantially constant. It is critically important that this distance remain substantially constant in order that the laser beam 12" remain focused precisely at the surface 46 of the composition so as to achieve dimensionally photoformed layers. Even though a typical photoformable composition 40 may change in volume upon polymerization by shrinking approximately one (1) percent, in practice such a change in volume is not significant and does not require any fine adjustments in the equilibrium level of the free surface 46 or the adding of additional composition 40, particularly when the mass of the object being fabricated is less than thirty (30) percent of the mass of the composition 40 in the vessel 44. Usually, the mass of the fabricated part is between one (1) and five (5) percent of the mass of the composition in the vessel 44. Du Pont's SOMOSä solid imaging materials are sufficiently close to "ideal" such that no fine turning of the equilibrium level of the free surface 46 is necessary during the fabrication process. It is also significant in the present invention that the dispenser 43 allows the temporary level of the free surface 46 to be lowered while the doctor blade 73 moves across the platform 41, so that the doctor blade 73 minimizes any type of wave motion in the composition surrounding the previously exposed layer, thereby preventing any such wave motion from disturbing the previously exposed layer, particularly those parts of the exposed layer which are partially unsupported.

Figure 2:
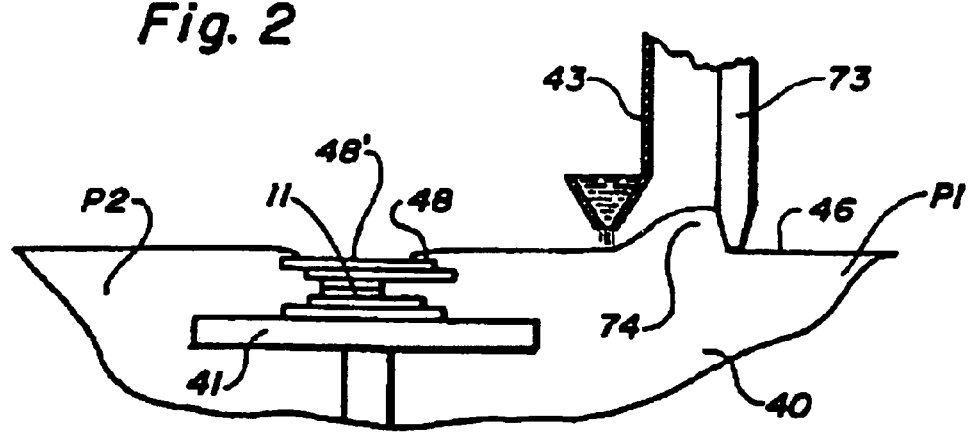
FIG. 2 is an elevation view showing a part of the coating station including a is dispenser employed in the present invention.
Figure 23:
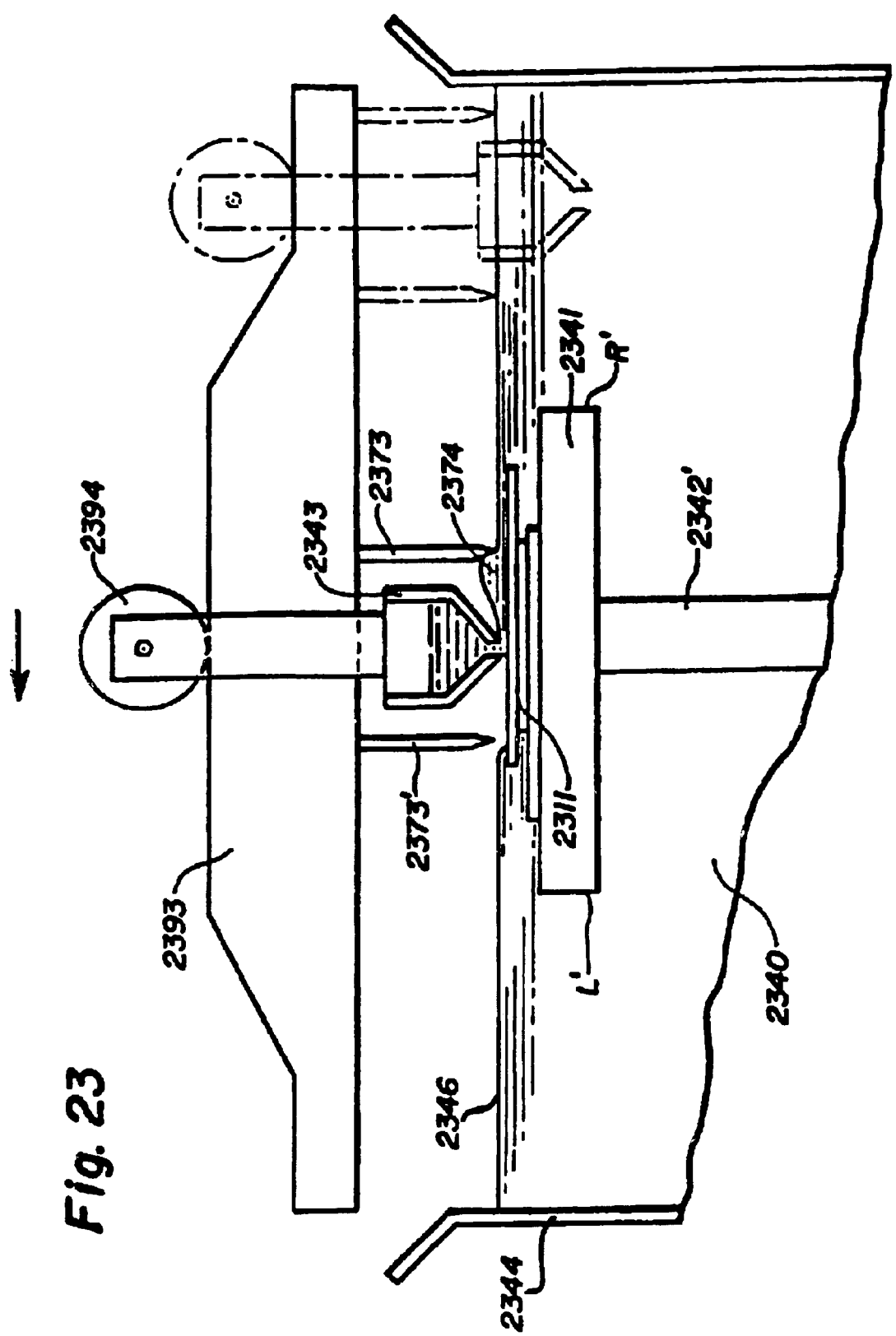
FIG. 23 is a schematic elevation view showing an embodiment of the present invention for lowering and raising the dispenser shown in FIG. 2 at predetermined positions and time periods.

FIG. 2 illustrates the usefulness of the dispenser 43. When the platform 41 is lowered by the thickness of the layer 48, the composition 40 does not form a complete layer on top of previously solidified layers 11. Thus, unless the three dimensional object has very limited dimensions, only a small part of the surface of the most recently solidified layer is covered by the liquid layer 48, while a remaining part 48' of the surface remains uncoated. Any conventional means may be used to lower and raise the dispenser 43 at predetermined positions and time periods. Such means include but are not limited to motors combined with rails in the form of cams, electromagnets, and the like. One example is illustrated schematically in FIG. 23. In the embodiment shown in FIG. 23, a rail cam 2393 is employed to lower and raise the dispenser 2343 under and above the free surface 2346 of the photoformable composition 2340, respectively. The dispenser 2343 is also shown with dotted lines, adjacent the right side R' of the platform 2341, where it has been lowered due to the shape of the rail cam 2393, the path of which is followed by cam follower 2394. It is understood that the dispenser will also be lowered adjacent the left side L', and raised in the intermediate position as shown by the complete lines.

In operation, referring back to FIGS. 1 and 2, the dispenser 43 is dipped into the photoformable composition 40 and then it is raised above the free surface 46 of the composition 40. As soon as the dispenser 43 is raised above the free surface 46 of the composition 40, the composition 40 from the dispenser 43 starts being dispensed in front of the doctor blade 73, preferably by force of gravity. It is very important that there be an abundance 74 of the composition 40 in front of the doctor blade 73 so that a complete layer 48 may be formed. To avoid entrapment of air in the form of air bubbles in the abundance 74 of composition 40 in front of the doctor blade 73, it is important that the dispenser 43 be raised only slightly above the free surface 46 of the photoformable composition 40. It has also been found that the continuity of the liquid dispensed as a curtain or extrusion sheet by the dispenser 43 may suffer interruptions and splitting if the distance between the dispenser 43 and the free surface 46 is high. This will depend, however, on the Theological characteristics of the photoformable composition 40, the characteristics of the dispenser 43, and other factors. Thus, it is preferable in general that the dispenser 43 be raised by less than 5 mm, more preferable by less than 2 mm, and even more preferable by between 0.5 mm and 1 mm above the free surface 46 of the composition 40. It should be noted, however, that during dispensing, the gap between the free surface 46 of the composition 40 and the dispenser 43 should be equal to or greater than the gap between the same free surface 46 and the corresponding doctor blade 73.

After the dispenser 43 has been raised, both the dispenser 43 and the doctor blade 73 move forward with the dispenser 43 leading and the doctor blade 73 following. The distance between the previously solidified layers 11 and the doctor blade 73, when the doctor blade 73 is passing above the solidified layers 11, is maintained constant and corresponds to about the thickness of the layer 48. After a full pass, a short time may be allowed for the surface 46 of the composition 40 to stabilize, after which the step of exposing imagewise is performed. The speed of travel of the assembly of dispenser 43 and doctor blade 73 should be lower than a certain limit in order to avoid air entrapment in the form of bubbles. This limit depends on the rheological and foaming characteristics of the photohardenable composition 40. With the photohardenable compositions employed by the applicants, speeds of less than 1 inch per second, and preferably about 0.5 inch per second are adequate to cause only minimal air entrapment.

Figure 3:
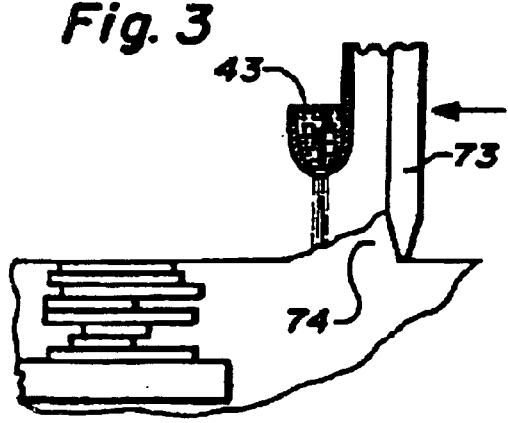
FIG. 3 is an elevation view showing a dispenser for dispensing liquid composition.
Figure 4A:
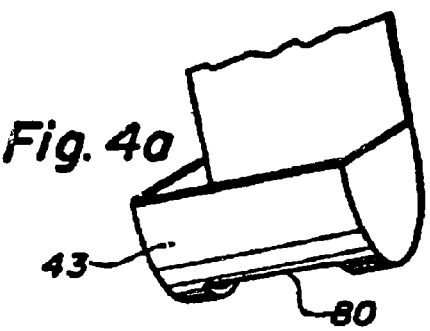
FIGS. 4a and 4b are perspective views illustrating the embodiment of FIG. 3.
Figure 4B:
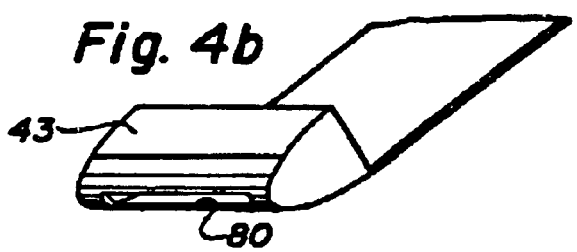
Figure 5:
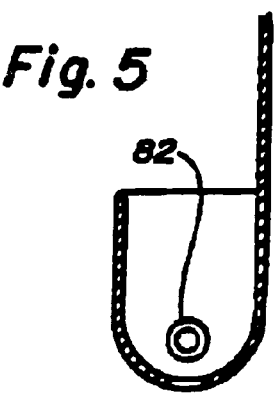
FIG. 5 is an elevation view showing another embodiment of this invention.
Figure 6:
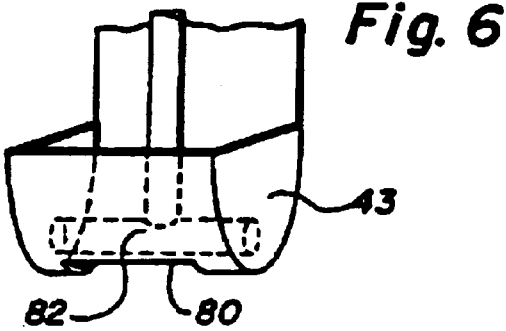
FIG. 6 is a perspective view showing the embodiment of FIG. 5.

The dispenser 43 may be shaped like a trough as shown in FIGS. 3, 4a and 4b. It has a slot 80 at the bottom so that liquid can freely run through. Depending on viscosity of the composition 40, the slot 80 can be thinner or wider in order to deliver a proper amount 74 of composition 40 in front of the doctor blade 73. It may also have the form of a plurality of openings in proximity to each other. During the dipping operation, it is preferable that the dispenser 43 is not dipped completely under the free surface 46 of the composition 40, so that the composition 40 enters the dispenser 43 through the slot 80, or in general through the bottom opening in whatever form it might be, and not over the top, in order to avoid air entrapment, especially with compositions of high viscosity. The dipping and raising rates are also important for preventing air entrapment, and should be adjusted depending on the viscosity, surface tension and, in general, the foaming characteristics of the composition 40. As shown in FIGS. 5 and 6, a valve 82 may be incorporated in the design of the dispenser 43 so that it can control the slot 80 according to the desired delivery rate for the composition 40. In this particular example, illustrated in FIGS. 5 and 6, this valve 82 can comprise just a rod which can be moved closer or further away to slot 80 in order to permit more or less material to go through at the desired rate.

In another embodiment of the present invention, illustrated in FIG. 7, the dispenser 743 is connected through a hinge 775 so that when the dispenser 743 is to be dipped, it is in an upright position so as to accept the liquid photoformable composition 40 within its cavity; however, when it is raised and ready to deliver the liquid composition, it is pivoted and inclined around hinge 775 as shown in FIG. 7.

FIG. 10 illustrates another embodiment of the invention where the dispenser 1043 in front of the doctor blade 1073 is just a single plate. This arrangement is especially useful when the viscosity of the composition is high enough so that adequate material is attached to blade 1043. The material is then delivered in front of the doctor blade 1073 by force of gravity.

Still another embodiment is shown in FIG. 11, where the dispenser 1143 comprises a plurality of parallel plates connected at the top. This arrangement of the dispenser 1143 allows air to leave the system while it is being immersed into the composition and also allows air to enter system when the composition is being disposed through holes 1183 perforated at the top connecting the parallel plates.

Dispenser 1243, in a different embodiment shown in FIG. 12, may also have the form of a brush so that it can accommodate more liquid.

Still another form of dispenser 1343 is shown in FIG. 13. In this case the dispenser 1343 has the form of a plate with a plurality of pockets 1384 having, preferably, holes 1385 at the bottom of each pocket 1384.

FIGS. 8a through 8e illustrate still another embodiment of this invention. In this embodiment there are two plates 885 and 886, initially substantially parallel to each other. As shown in FIG. 8a, the plates 885 and 886 are initially outside the liquid. Then (FIG. 8b) the plates 885 and 886 are dipped into 5 the liquid, while they are still kept substantially parallel to each other. The reason for this parallel configuration is to avoid turbulence and air entrapment within the composition 840 while the dispenser is being dipped. After the plates 885 and 886 have been dipped into the composition 840 (FIG. 8c), they are pivoted to assume a V shape so that their bottoms meet while the top parts of the plates 885 and 886 still remain open. FIG. 8d shows the plates 885 and 886 in the V position outside the liquid composition 840. This is followed by slightly opening the bottom parts of the plates to form a narrow slot and allow the composition to be dispensed through the slot (FIG. 8e). The configuration of these two plates 885 and 886 is better shown in FIG. 9a and 9b. Plate 885 has two pivoting pins 888 and 888' at the top. Plate 886 has two side walls 887 and 887' which have in their upper corners holes 889 and 889' which are adaptable to receive pivots 888 and 888'. Thus, the two plates 885 and 886 may be assembled in the form of a dispenser, by pivoting plate 885 around pivots 888 and 888', which in turn are inserted in holes 889 and 889', respectively. The plate 885 may seal the dispenser by closely contacting the walls 887 and 887'. In this configuration, if so desired, a slot may be formed at the bottom of the plates, or the plates may be arranged to be substantially parallel to each other, or the whole device can be in a closed position and not allow liquid to pass through, when the bottoms of the plates are brought into contact. Leakage of small amounts of liquid through the walls of the plate 886 and the sides of the plate 885 is not of consequence in most instances. Gasketing materials may be used on the sides and bottom of the plate 885, and/or the walls and bottom of the plate 886, if desired, for better sealing. The walls 889 and 889' may be replaced by a flexible or elastic material for connecting the sides of the two plated in a substantially liquid-proof manner. Any conventional mechanism may be used for opening and closing the blades. Such mechanisms may include but are not limited to bars, wires, and the like, connected to the plate 885 For controllably changing the position of one plate with respect to the other.

Figure 14A:
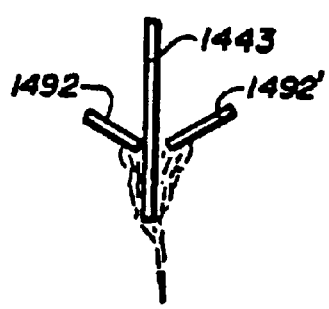
FIG. 14a is an elevation view illustrating the use of wipers to control the dispensing rate of photoformable composition from a plate-like dispenser.
Figure 14B:
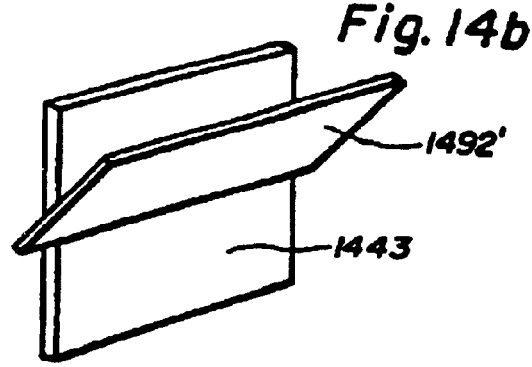

FIGS. 14a and 14b illustrate an additional embodiment of this invention, where the dispenser 1443 is in the form of a plate. Wipers 1492 and 1492' are provided to controllably dispense picked-up composition by wiping such composition downward. Thus, when the plate 1443 has been dipped and raised in front of the doctor blade (the doctor blade is not shown in FIG. 14a for clarity purposes), the wipers 1492 and 1492' start moving downward at a desired rate, preferably controlled by the computer 34. Similar results may be achieved by holding the wipers 1492 and 1492' at a constant distance from the free surface 46 of the composition 40, and raising the dispenser plate 1443 at a desired rate. Of course, this rate may be variable to better fit the dispensing requirements of the particular case. FIG. 14b shows a perspective view of the dispenser 1443 in plate form in combination with one of the wipers 1492'.

Figure 15A:
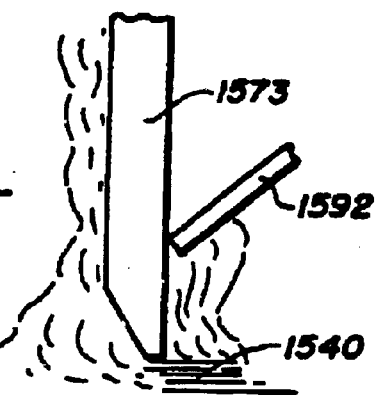
FIGS. 15a and 15b are elevation views illustrating another embodiment of the present invention wherein the doctor blade itself serves as the dispenser.
Figure 15B:
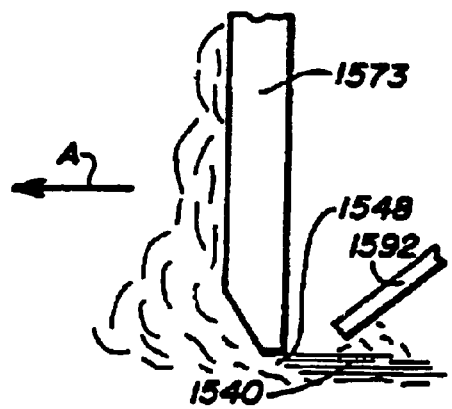

As shown in FIGS. 15a and 15b, the doctor blade itself 1573 can be used also as a dispenser. The doctor blade 1573 is dipped into the composition 1540 and then it is raised to its initial position over the free surface of the photoformable composition, as shown in FIG. 15a. Since the doctor blade is going to form the coating by moving in the direction of arrow A, it is desirable to have a wiper 1592 which moves down and wipes off the excess composition gathered on the back side of the doctor blade 1573. This is to avoid dragging any material behind the doctor blade 1573 and destroying the uniformity of the produced layer. FIG. 15a shows the wiper 1592 taking off the excess composition. FIG. 15b shows the same doctor blade 1573 after it has already started doctoring and leveling a layer 1548 of photoformable composition 1540, while the wiper 1592 has been lowered and positioned around the free surface of the photoformable composition 1540. A different way to minimize accumulation of excessive amounts of composition on the back side of the doctor blade 1573 is to dip the blade as it is moving, preferably at an angle smaller than 90 degrees, which increases with time and finally assumes a value of substantially 90 degrees before the doctor blade moves on top of the photoformed layers. This angle is the angle formed between the plane substantially containing the front side of the doctor blade and the plane substantially containing the free surface (FIG. 1) of the photoformable composition.

Figure 16A:
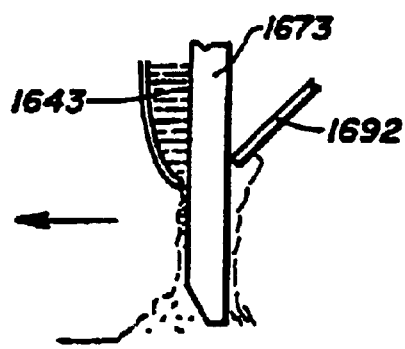
Figure 16B:
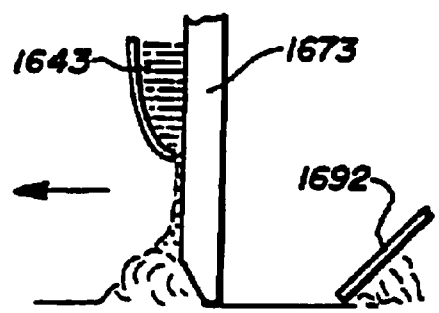

The dispenser 1643 shown in FIGS. 16a and 16b may be part of the doctor blade 1673 and located in the front part of the doctor blade 1673. The wiper 1692 performs the same task as described in previous embodiments. FIG. 16b illustrates the doctor blade 1673 after it has been moved from its initial position, and also shows the wiper 1692 in its lower position.

The front of the doctor blade 1743, as shown in FIGS. 17a and 17b, may have pockets similar to the ones shown in FIGS. 13a and 13b for the dispenser 1743. According to this embodiment, the doctor blade 1743 is dipped into the composition and then raised while the wiper 1792 is stationary near the free surface of the photoformable composition so as to immediately wipe off any excess material on the back part of the blade 1743. It should be understood that the embodiments already described or the ones described below can be combined in part or in whole. For example, in any of these embodiments the wiper may be either stationary or movable.

Another embodiment, shown in FIG. 18, illustrates the dispenser 1843 being part of and located in front of the doctor blade 1873, while the wiper 1892 is stationary and at the bottom of the doctor blade 1873 when the blade 1873 is in its initial position.

In still another embodiment illustrated in FIG. 19, the dispenser 1943 and the doctor blade 1973 can be combined into a unit having a common dispensing tip 1995 at the bottom of the combined device. In FIG. 19, this combined device is shown while it is providing a layer, while the wiper 1992 has already wiped the back of the device and is in a lowered position.

FIG. 20 shows still another embodiment where the dispenser 2043 is in the form of a plate which is continuously dipped into the composition 2040. The dispenser 2043 is provided with a pivot 2075 around which the plate may give an upward pulse. Just before the doctor blade 2073 starts its movement for producing a layer, the dispenser 2043 provides an upward pulse and produces an abundance of material 2074 in the form of a wave in front of the doctor blade 2073. Frequently, this amount of material is adequate for a complete layer to be formed. This embodiment works at its best when the platform and the three-dimensional object to be formed are not excessively large.

Figure 21:
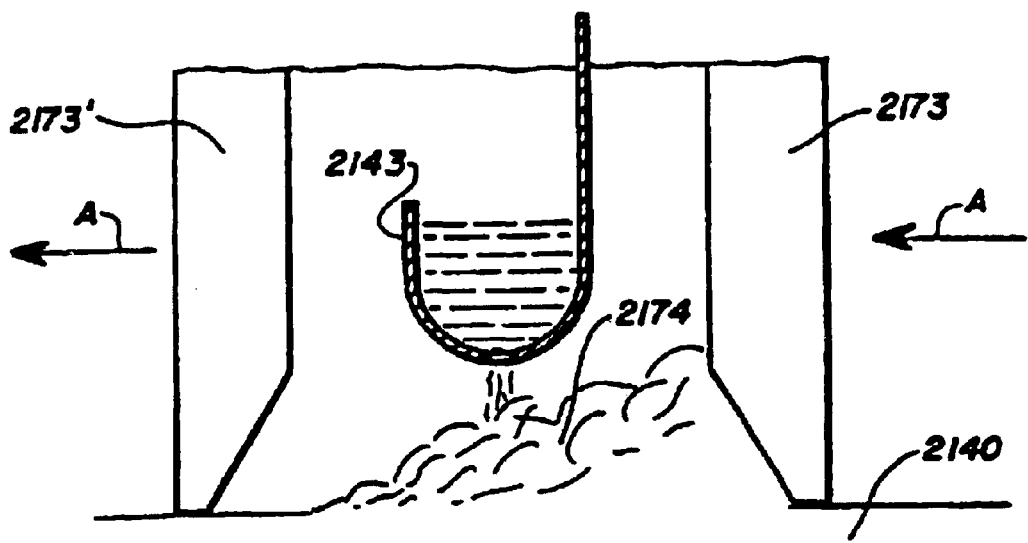
FIG. 21 is an elevation view showing an additional preferred embodiment where two doctor blades are utilized, with the dispenser located between the two doctor blades.

Two doctor blades 2173 and 2173' may be used, one on each side of the dispenser 2143, as illustrated in FIG. 21, so that a new layer may be produced regardless of the direction in which the doctor blade/dispenser assembly moves. When the assembly moves in the direction of the arrows A, the abundance of material is gathered mainly in front of the blade 2173, and a new layer is formed behind the blade 2173. Similarly, when the assembly moves in a direction opposite to that of the arrows A, the abundance of material is gathered mainly in front of the blade 2173', and a new layer is formed behind the blade 2173'. It is important that when the assembly stops on either side of the platform, the dispenser is dipped in the liquid, composition 2140 to be refurnished with a new amount of photoformable composition 2140 for the next cycle, in the opposite direction.

Figure 22:
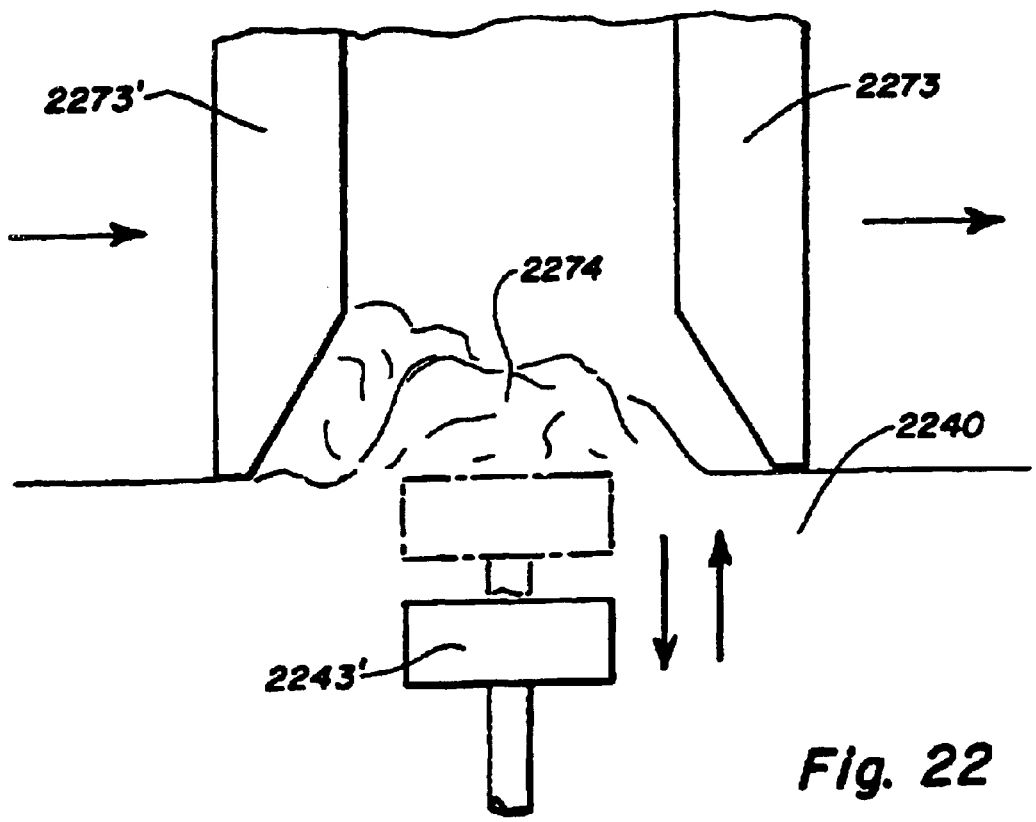
FIG. 22 is an elevation view showing another embodiment where two doctor blades are utilized with the dispenser located between the two blades.

The embodiment illustrated in FIG. 22 also involves a double doctor blade arrangement (2273 and 2273') similar to that shown in FIG. 21, except that the dispenser 2243', in this case, is always disposed in the liquid photoformable composition 2240. There is one dispenser 2243' on one side of the platform and one dispenser 2243 (not shown) on the other side of the platform. Their position is located within the composition 2240, and under the "stop" positions of the doctor blades on either side of the platform. Just before the doctor blades start their travel, the respective dispenser moves quickly upward and forces an abundance of liquid to gather between the two doctor blades. The rest of the operation is substantially the same as in the other embodiments.

In the cases where the dispenser and the doctor blade are separate units, it is often desirable to dip the dispenser in a particular manner. For example, as shown in FIG. 2, it is often preferable to dip the dispenser 43 at position P2 while the initial position of the doctor blade 73 is on the other side of the platform at position P1. According to this option, the dispenser 43 is moved over to position P2, it is dipped at this position in order to receive an adequate amount of composition, then it is raised and brought back in front of the doctor blade 73 at position P1. During this movement, the dispenser 43 may continue delivering material over the platform area. On other occasions where the delivery of material can be controlled, such as in the embodiments shown in FIGS. 5, 6, 7 or 8, it may be desirable for the dispenser to start dispensing composition only when it is in front of the doctor blade 73 at position P1 and at the same time that the doctor blade 73 is forming the layer. This version of operation may be desirable when higher accuracy and speed are needed since the material received by the dispenser 43 at position P2 is going to be moved back by the doctor blade 73.

In most cases it is desirable for the dispenser 43 to be in the dipped position while exposing the layer, so that material still held by the dispenser will be in the container and will not change the level of the free surface of the composition and of the layer. As mentioned before, it is important for the dispensed liquid to be very close to the free surface of the composition in order to avoid splashing and entrapment of air in the form of bubbles. Of course, one can work under vacuum, thereby making the height at which the dispenser operates immaterial.

Since all these devices are controllable by a computer, one can arrange the delivery cycle as well as their speed of operation in order to obtain maximum efficiency and uniformity. Depending on the viscosity and other properties of the photoformable liquid composition, somewhat different conditions may be needed to obtain optimal results. Sensors such as ultrasonic, infrared, and the like may be used to give feedback to the computer regarding the build-up in front of the doctor blade and regulate, accordingly, the delivery through the above mechanism.

The photoformable compositions which can be used in the practice of the instant invention are any compositions which undergo solidification under exposure to actinic radiation. Such compositions comprise usually but not necessarily a photosensitive material and a photoinitiator. The word "photo" is used here to denote not only light, but also any other type of actinic radiation which may transform a deformable composition, preferably a liquid, to a solid by exposure to such radiation. Cationic or anionic polymerizations, as well as condensation and free radical polymerizations and combinations thereof are examples of such behavior. Cationic polymerizations are preferable, and free radical polymerizations even more preferable. Photoformable compositions containing thermally coalescible materials are of even higher preference.

A liquid thermally coalescible photoformable composition is a composition which solidifies upon exposure to actinic radiation without attaining necessarily its ultimate physical properties, particularly with respect to their adhesive and cohesive characteristics. However, it develops adequate integrity to be handled until such time when further treatment is provided. The composition is considered as coalescible when it comprises particulate matter in dispersed form, which particulate matter undergoes coalescence under a certain set of conditions, such as increased temperature for example. Coalescence is the transformation of a dispersed phase to a cohesive continuous solid phase.

Preferably the photoformable composition comprises a thermally coalescible polymeric cohesive material, a photoformable monomer, and a photoinitiator. Preferably the photoformable material comprises an ethylenically unsaturated monomer. Upon exposure to the actinic radiation, the exposed areas of the photoformable composition must remain thermally coalescible after removing the unexposed areas. This is important to improve both adhesion in the joining surfaces between the layers and cohesion within the layers for a multilayer integral three dimensional object. Actually, cohesive bonds are formed at the joining surfaces by the thermally coalescible material, providing superior properties to the structure of the final three dimensional object. It is also very important to prevent substantial overgrowth of infra posed surfaces, as it will be discussed below.

In the case of photoformable compositions which are not based on coalescible materials, post treatment after the exposure step is not required. In the case where a coalescible material is an essential component of the formulation, further heat treatment is needed for the object to attain its ultimate strength. In such cases, when all the layers of the three dimensional object have been formed by the method described above, the unexposed portions of the composition may be removed by any conventional means, such as shaking the object, blowing gas towards the object, and the like. Further removal may be achieved by rinsing the object with poor, noncoalescing solvents. Water, alcohols, and in general polar solvents are poor solvents for non-polar compositions and vice-versa. As long as the solvent under consideration does not extract excessive amounts of materials from the exposed area or cause the object being rinsed to swell within the rinsing time, it is considered to be a poor, non-coalescing solvent. The object then is thermally coalesced in order to develop high cohesive and adhesive strength. This step may be performed in an oven, such as a convection, IR or microwave oven. Optimum temperature and time are dependent on the individual composition. Typically the temperature range is 100°–250° C. and the time range is 5–30 minutes. However, temperature and times outside these regions may be used.

A very important group of thermally coalescible materials are plastisols. Plastisols are fluid mixtures, ranging in viscosity from pourable liquids to heavy pastes, obtained by dispersing fine particle size polymeric resins in nonvolatile liquid thermal plasticizers, i.e., materials which are compatible with the polymer or resin and increase its workability and flexibility but have no substantial solvent activity for the resin or polymer under ordinary conditions of storage (e.g. room conditions). When the plastisol has been formed into a desired shape, e.g., by molding or coating, it can be heated to coalesce the polymeric resin particles and the nonvolatile liquid constituent, thereby forming a homogeneous solid mass. Volatile diluents can be added to plastisol dispersions to modify their viscosity and to achieve desirable handling characteristics in coating or other forming operations.

A dispersion that contains no more than 10% volatile diluent is regarded as a plastisol. Since the plasticizer used in the case of plastisols acts as a plasticizer to solvate the polymer only at temperatures higher than storage temperatures, it may also be called a thermal plasticizer. The most widely used plastisols on a polyvinyl chloride homopolymer in a plasticizer.

The following photohardenable composition was made by mixing thoroughly the following ingredients:

| | |
|---|---|
| 1. Ethoxylated Trimethylol Propane Triacrylate | 75.0 g |
| 2. Urethane Acrylate Resin (Sartomer 9610) | 75.0 g |
| 3. 2,2-dimethoxy-2-phenylacetophenone | '6.0 g |
| 4. Clear Chem-o-sol ® 7557 (made by Whittaker Corp. Providence Chemical Division, East Providence, RI) | 225.0 g |

An automobile distributor cap of excellent quality was made by using this photohardenable composition, and the method and apparatus as described hereinabove. The double doctor blade arrangement with the dispenser as shown in FIG. 21 was used. When the dispenser was at rest on either side of the platform, it was maintained completely immersed under the free surface of the photohardenable composition During dispensing at the raised position, the dispenser was 1 mm above the free surface of the composition. The slot width was approximately 0.190 inch and the travelling speed 0.5 inch per second. Only a minimal amount of bubbles were observed on the free surface of the composition. No interruptions occurred on either the dispensed liquid or on the layers, which were 0.015 inch thick. After the distributor top was photoformed it was thermally treated in a convection air oven at 165° F. for 15 minutes for the part to achieve its ultimate strength. It should be noted that when the dispenser was raised more than 5 mm above the free surface of the composition, the dispensed liquid in the form of a curtain had interruptions along its width resulting in inadequate coverage of previously photoformed layers.

What is claimed is:

1. A solid imaging apparatus, said apparatus including:
   (i) a vessel containing a photoformable composition;
   (ii) a movable platform disposed within said vessel;
   (iii) a sub-assembly comprising a movable dispenser, said movable dispenser defining an opening;
   wherein said sub-assembly is adapted to both receive and deposit part of said photoformable composition through said opening.

2. The apparatus of claim 1, wherein said opening is a downwardly facing elongated slot.

3. The apparatus of claim 1, wherein said movable dispenser is adapted to deposit part of said photoformable composition above said platform.

4. The apparatus of claim 1, wherein said apparatus further comprises a radiation source capable of curing said photoformable composition.

5. The apparatus of claim 1, wherein said dispenser comprises a pair of plates that hold the lifted composition therebetween.

6. The apparatus of claim 1, wherein said dispenser includes a holding mechanism that holds the lifted composition above the surface of said photoformable composition in the vessel.

7. The apparatus of claim 1, wherein the dispenser includes a blade with an edge positioned at the surface of said photoformable composition in the vessel.

8. The apparatus of claim 1, wherein said dispenser includes a blade with a holding mechanism that holds lifted composition against a surface of the blade.

9. The apparatus of claim 1, wherein the dispenser includes a pair of plates that form a holding chamber therebetween, wherein a portion of the composition is retained within the chamber while another portion of the composition is allowed to flow from the chamber by force of gravity.

10. A solid imaging system comprising:
    (a) a photoformable composition including free radical polymerizable material; and
    (b) an apparatus including
       (i) a vessel for containing said photoformable composition;
       (ii) a movable platform disposed within said vessel;
       (iii) a sub-assembly comprising a movable dispenser, said movable dispenser defining an opening;
       wherein said sub-assembly is adapted to both receive and deposit part of said photoformable composition through said opening.

11. The system of claim 10, wherein said opening is a downwardly facing elongated slot.

12. The system of claim 10, wherein said movable dispenser is adapted to deposit part of said photoformable composition above said platform.

13. The system of claim 10, wherein said apparatus further comprises a radiation source capable of curing said photoformable composition.

14. The system of claim 10, wherein said dispenser comprises a pair of plates that hold the lifted composition therebetween.

15. The system of claim 10, wherein said dispenser includes a holding mechanism that holds the lifted composition above the surface of said photoformable composition in the vessel.

16. The system of claim 10, wherein the dispenser includes a blade with an edge positioned at the surface of said photoformable composition in the vessel.

17. The system of claim 10, wherein said dispenser includes a blade with a holding mechanism that holds lifted composition against a surface of the blade.

18. The system of claim 10, wherein the dispenser includes a pair of plates that form a holding chamber therebetween, wherein a portion of the composition is retained within the chamber while another portion of the composition is allowed to flow from the chamber by force of gravity.

19. The system of claim 10, wherein said composition further comprises cationically polymerizable material.

20. The system of claim 10, wherein said free radical polymerizable material includes ethoxylated trimethyloipropane triacrylate.

21. The system of claim 18, wherein said free radical polymerizable material includes ethoxylated trimethylolpropane triacrylate.

22. The system of claim 10, wherein said composition comprises thermally coalescible polymeric cohesive material.

23. A solid imaging system comprising:
    (a) an apparatus; and
    (b) a photoformable composition adapted for use in said apparatus;
    wherein
       said composition comprises
          (i) an ethylenically unsaturated monomer; and
       said apparatus comprises
          (i) a vessel for containing said composition;
          (ii) a movable platform disposed within said vessel;
          (iii) a sub-assembly comprising a movable dispenser, said movable dispenser defining an opening, said sub-assembly being adapted to both receive and deposit part of said photoformable composition through said opening; and
          (iv) a radiation source capable of curing said photoformable composition.

24. The system of claim 23, wherein said dispenser includes a holding mechanism that holds the lifted composition above the surface of said photoformable composition in the vessel.

25. The system of claim 23, wherein the dispenser includes a pair of plates that form a holding chamber therebetween, wherein a portion of the composition is retained within the chamber while another portion of the composition is allowed to flow from the chamber by force of gravity.

26. The system of claim 23, wherein said composition further comprises cationically polymerizable material.

27. The system of claim 23, wherein said free radical polymerizable material includes ethoxylated trimethylolpropane triacrylate.

28. The system of claim 23, wherein said composition further comprises thermally coalescible polymeric cohesive material.

29. A solid imaging system comprising:
(a) an apparatus; and
(b) a photoformable composition adapted for use in said apparatus;
wherein
said composition comprises
(i) free radical polymerizable material; and
said apparatus comprises
(i) a vessel for containing said composition;
(ii) a movable platform disposed within said vessel;
(iii) a sub-assembly comprising a movable dispenser, said movable dispenser defining an opening, said sub-assembly being adapted to both receive and deposit part of said photoformable composition through said opening; and
(iv) a radiation source capable of curing said photoformable composition;
wherein said dispenser includes a holding mechanism that holds the lifted composition above the surface of said photoformable composition, said holding mechanism including a pair of plates that form a holding chamber therebetween, wherein a portion of the composition is retained within the chamber while another portion of the composition is allowed to flow from the chamber by force of gravity.

* * * * *